United States Patent
Demilato et al.

(10) Patent No.: US 9,184,606 B2
(45) Date of Patent: Nov. 10, 2015

(54) BATTERY CHARGER

(71) Applicant: STMicroelectronics S.r.l., Agrate Brianza (IT)

(72) Inventors: Giuliana Demilato, Francavilla Fontana (IT); Agatino Antonino Alessandro, Riposto (IT); Santi Carlo Adamo, Aci Castello (IT); Liliana Arcidiacono, Tremestieri Etneo (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 343 days.

(21) Appl. No.: 13/774,324

(22) Filed: Feb. 22, 2013

(65) Prior Publication Data

US 2013/0229146 A1 Sep. 5, 2013

(30) Foreign Application Priority Data

Mar. 2, 2012 (IT) .......................... MI2012000332 A

(51) Int. Cl.
*H02J 7/00* (2006.01)
*H02J 9/06* (2006.01)

(52) U.S. Cl.
CPC ............ *H02J 7/0029* (2013.01); *H02J 7/0031* (2013.01); *H02J 7/0052* (2013.01); *H02J 9/06* (2013.01); *H02J 7/008* (2013.01); *H02J 7/0009* (2013.01); *H02J 7/0022* (2013.01); *H02J 7/0024* (2013.01); *H02J 7/0068* (2013.01); *H02J 7/0077* (2013.01); *H02J 2007/0062* (2013.01)

(58) Field of Classification Search
CPC . H02J 2007/0062; H02J 7/0077; H02J 7/008; H02J 7/0009; H02J 7/0022; H02J 7/0024; H02J 7/0068; H03J 7/0026

USPC .................................................. 320/107, 135
See application file for complete search history.

(56) References Cited

U.S. PATENT DOCUMENTS

| | | | | |
|---|---|---|---|---|
| 4,543,565 | A * | 9/1985 | Oberstein et al. | 340/506 |
| 4,563,274 | A * | 1/1986 | Rothon et al. | 210/101 |
| 5,003,455 | A * | 3/1991 | Miller | 363/87 |
| 5,790,961 | A | 8/1998 | Ingram et al. | |
| 5,815,802 | A * | 9/1998 | Loechner, II | 455/414.1 |
| 6,329,796 | B1 * | 12/2001 | Popescu | 320/134 |
| 7,276,881 | B2 * | 10/2007 | Okumura et al. | 320/134 |
| 7,495,416 | B2 * | 2/2009 | Sato et al. | 320/134 |
| 7,872,822 | B1 * | 1/2011 | Rothberg | 360/31 |
| 8,004,509 | B2 * | 8/2011 | Baek et al. | 345/204 |
| 2003/0169021 | A1 | 9/2003 | Kashine | |
| 2003/0220026 | A1 | 11/2003 | Oki et al. | |

(Continued)

OTHER PUBLICATIONS

Italian Search Rport and Written Opinion dated Nov. 22, 2012 from corresponding Italian Application No. MI2012A 000332.

(Continued)

*Primary Examiner* — Stacy Whitmore
(74) *Attorney, Agent, or Firm* — Allen, Dyer, Doppelt, Milbrath & Gilchrist, P.A.

(57) ABSTRACT

A battery charger which includes an input supply terminal configured to receive a supply signal, a battery terminal configured to be connected to a battery, at least one output terminal and an electrical path between the battery terminal and the output terminal, at least one device for the detection of one alarm condition of the battery or the battery charger. The battery charger includes circuitry configured to enable the at least one detection device at timing intervals when the battery supplies the at least one output terminal.

8 Claims, 4 Drawing Sheets

(56) References Cited

U.S. PATENT DOCUMENTS

| | | |
|---|---|---|
| 2005/0127879 A1* | 6/2005 | Sato et al. .................. 320/134 |
| 2005/0269992 A1 | 12/2005 | Lai et al. |
| 2006/0049804 A1* | 3/2006 | Saeki et al. ................ 320/136 |
| 2007/0103143 A9* | 5/2007 | Ooshita et al. ............. 324/134 |
| 2008/0150488 A1 | 6/2008 | Lu et al. |
| 2009/0009138 A1 | 1/2009 | Ahmad et al. |
| 2013/0038275 A1* | 2/2013 | Chen et al. ................. 320/107 |

OTHER PUBLICATIONS

Italian Search Rport and Written Opinion dated Oct. 1, 2012from related Italian Application No. MI2012A 000333.

* cited by examiner

BATTERY CHARGER

CROSS REFERENCE TO RELATED APPLICATIONS

This application claims the priority benefit of Italian patent application serial number MI2012A000332, filed on Mar. 2, 2012, which is hereby incorporated by reference to the maximum extent allowable by law.

BACKGROUND

1. Technical Field

The present invention relates to a battery charger.

2. Discussion of the Related Art

Nowadays mobile phones, digital cameras, notebooks, netbooks, tablets etc. have become daily used electronic devices. The power of the batteries of these electronic devices determines a length of time of use of the electronic device. Electronic devices such as mobile phones, digital cameras, notebooks, netbooks, tablets etc. should be used with corresponding battery chargers. Generally, these battery chargers (or called as power supplies) are unique to the corresponding electronic devices.

Typically, each battery charger is provided with an input terminal, such as a USB terminal, for connection to the power line for charging the battery and simultaneously powering the device connected to the battery, as shown in FIG. 1.

The battery charger 20 in FIG. 1 comprises the USB input terminal IN, a control block 10 configured to control first M1 and second M2 transistors arranged in the path between the input terminal IN and the output terminals SYS and Ld and third M3 and fourth M4 transistors arranged in the path between the input terminal IN and the battery BAT downstream the transistors M1, M2. When a supply voltage is present at the input terminal IN, the control block 10 turns on the transistors M1-M4 to provide power to the loads connected to the terminals SYS and Ld and to charge the battery BAT. When the supply voltage is not present at the input terminal IN, the control block 10 turns on the transistors M3-M4 and turns off M1-M2 so the power deriving from the battery BAT supplies the loads connected to the terminals SYS and Ld and the battery charger itself.

The control block receives an enable signal CEN an a shut-down signal SD and comprises a current modulation block adapted to control the transistor M4. Also the control block 10 is able to send an enable signal EN to a LDO block configured to supply an external load with a constant voltage by means of the output terminal Ld.

Also the battery charger comprises some protection circuits to operate the battery disconnection when a protection parameter such as the over discharge current (OCD) or the over discharge voltage (OVD) happens. For the continuous monitoring of the protection parameters the battery charger may consume a certain quantity of current, for example up to 15 microampere, which can be considered high in the case wherein a load, for example a microcontroller, connected with the battery charger has the same current consumption.

SUMMARY

In view of the state of the art, embodiments provide a battery charger device provided with a parameter monitoring system that reduces the current consumption.

According to an embodiment, there is provided a battery charger comprising an input supply terminal configured to receive a supply signal, a battery terminal configured to be connected to a battery, at least one output terminal and an electrical path between the battery terminal and the output terminal, at least one device for the detection of one alarm condition of the battery or the battery charger, comprising circuitry configured to enable said at least one detection device at timing intervals when the battery supplies the at least one output terminal.

BRIEF DESCRIPTION OF THE DRAWINGS

The features and advantages of the embodiments will become apparent from the following detailed description of an embodiment thereof, illustrated only by way of non-limitative example in the annexed drawings, in which.

DETAILED DESCRIPTION

Figure 1:
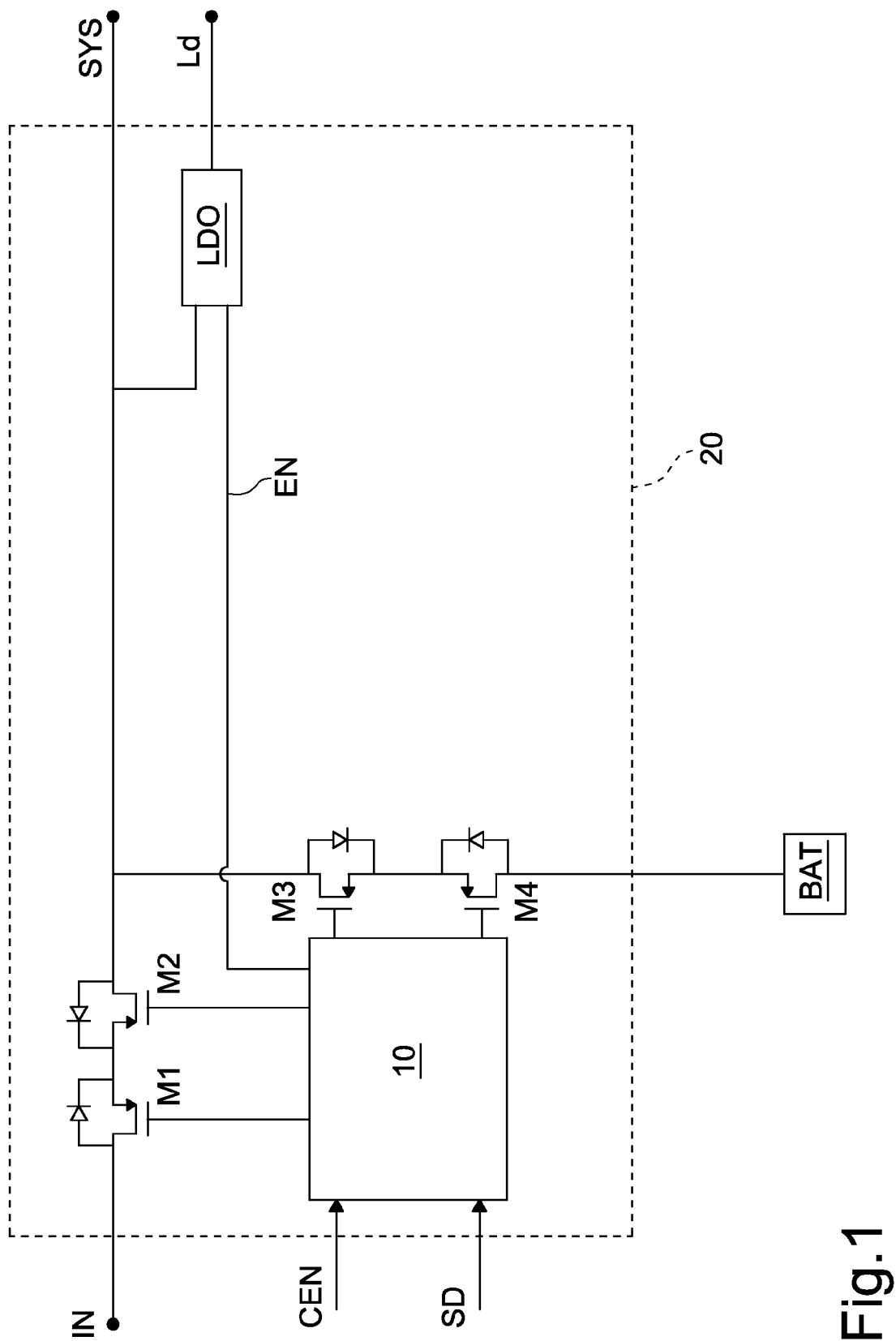
FIG. 1 shows a battery charger according to prior art.
Figure 2:
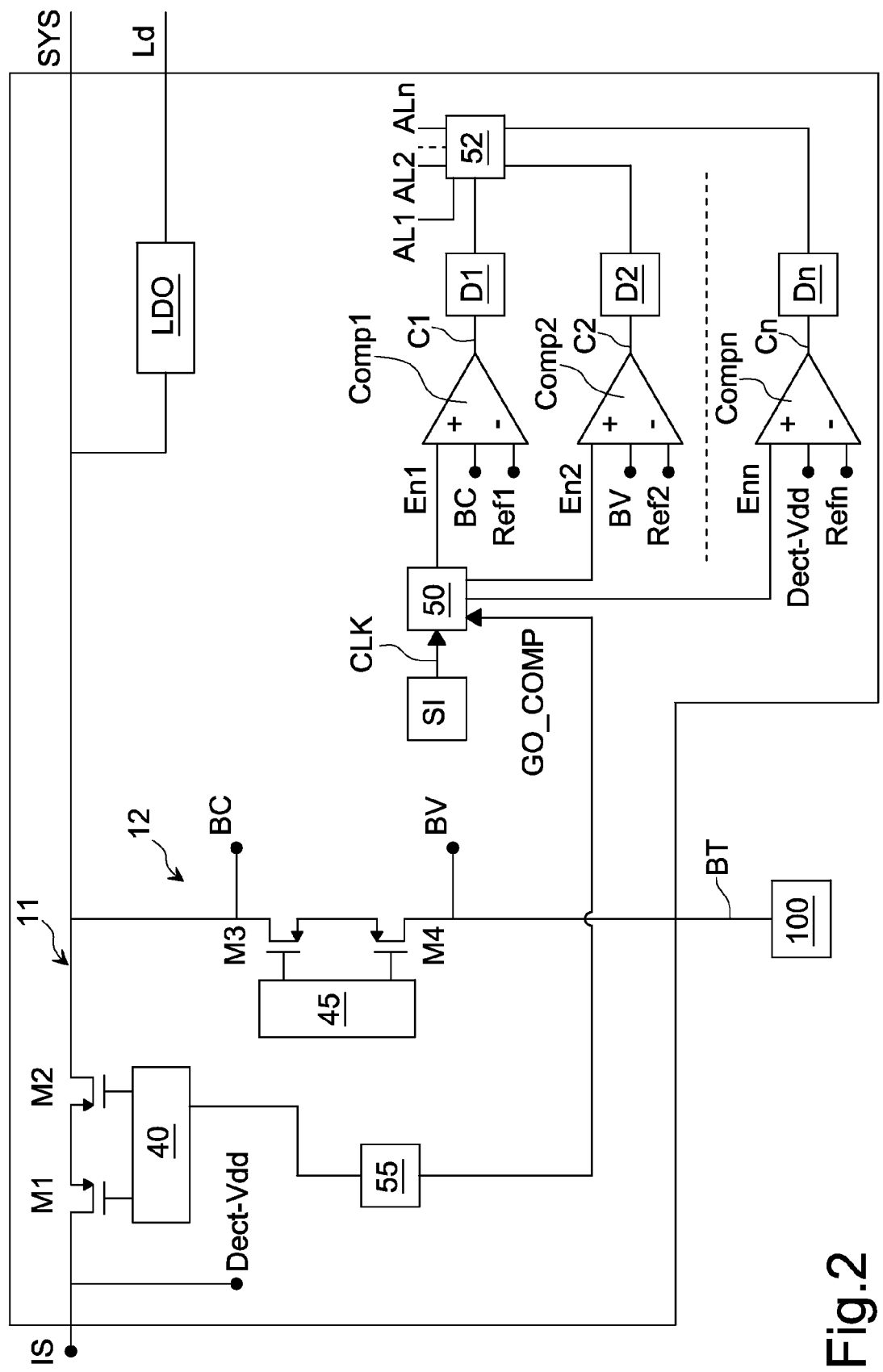
FIG. 2 shows a battery charger according to an embodiment.

A battery charger device according to an embodiment is shown in FIG. 2.

The battery charger comprises an input supply terminal IS, for example a USB terminal, configured to receive a supply signal Vdd, a battery terminal BT configured to be connected to a battery 100, at least one output terminal SYS, Ld for the connection with an external device, an electrical path 11 between the input supply terminal IS and at least one output terminal SYS, Ld and another electrical path 12 between the battery terminal BT and at least one output terminal SYS, Ld.

Preferably the battery charger comprises two switches M1 and M2 arranged in the electrical path 11 between the input supply terminal IS and at least one output terminal SYS, Ld. Preferably the battery charger comprises two output terminals SYS and Ld and a block LDO that is connected to the electrical path 11, downstream the switches M1 and M2, an provides to supply the output terminal Ld with a constant voltage and current. The switches M1 and M2 are controlled by a control circuit block 40.

The battery charger comprises another couples of switches M3 and M4 arranged in the electrical path 11 between the output terminals SYS, Ld and the battery terminal BT. The switches M3 and M4, for example PMOS transistors, are controlled by another control circuit block 45. The control circuit blocks 45 and 40 are coupled with the power path controller 55 configured to control when the output terminal SYS, Ld must be supplied from the external supply Vdd, by means of the terminal IS, or from the battery 100.

The battery charger comprises means configured to detect malfunctioning or alarm conditions of the battery or the battery charger, for example an over current discharge (OCD) condition or an over voltage discharge (OVD) condition of the battery or the absence of the supply voltage Vdd at the input supply terminal IS.

The battery charger comprises at least one device Comp1, Comp2 . . . Compn configured to detect an alarm condition of the battery 100 or the battery charger. In one embodiment, the battery charger comprises a plurality of detection devices Comp1, Comp2 . . . Compn for detect a plurality of alarm conditions; said plurality of detection devices Comp1, Comp2 . . . Compn are preferably comparators, configured to compare parameters of the battery and the battery charger with reference signals to detect the malfunctioning or alarm conditions. As shown in FIG. 2, when the battery supplies the block LDO and the output terminal SYS, the comparator Comp1 is configured to detect the OCD condition by comparing a current signal BC of the battery 100 with a reference current Ref1, the comparator Comp2 is configured to detect the OVD condition by comparing a voltage signal BV of the battery 100 with a reference voltage Ref2, the comparator Compn is configured to detect the presence or absence of the supply voltage Vdd at the input supply terminal IS by comparing the signal Dect-Vdd at the input supply terminal IS with a reference voltage Refn A control circuit 50, which receives a clock signal CLK deriving from an oscillator 51, is configured to enable said at least one detection device at timing intervals Ten, preferably at regular timing intervals Ten. The control circuit 50 sends enable signals En1, En2 . . . Enn to the comparators Comp1, Comp2 . . . Compn when the battery 100 supplies the output terminal SYS, Ld. The supply of the output terminal SYS, Ld from the battery 100 is detected by the power path controller 55 which sends an enable signal GO_COMP to the control circuit 50. The enabling signals En1, En2 . . . Enn are signals adapted to enable each comparator Comp1, Comp2 . . . Compn for an enable time period Ten cyclically for each time period T; particularly each comparator Comp1, Comp2 . . . Compn is enabled from the control circuit 50 for the time period Ten and is disabled for a time period Tf for each time period T=Tf+Ten. If during the time period Ten a signal among the signals BC, BV, . . . Dect-Vdd is higher than the respective reference signals Ref1, Ref2 . . . Refn, the respective comparator Comp1, Comp2 . . . Compn outputs a high level logic signal C1, C2 . . . Cn and the control circuit 50 receives the high level logic signal C1, C2 . . . Cn. Normally the time period Ten is constant but, if the control circuit 50 receives a high level logic signal C1, C2 . . . Cn, it enables said comparator for a longer time period Ten, wherein the new time period Ten has a variable duration; if the logic signal C1, C2 . . . Cn passes from the high level to the low level within the time period Ten when the time period Ten is shorter than a prefixed time period td_1, td_2 . . . td_n, no alarm signal AL1, AL2, . . . ALn is sent at the output otherwise, when the time period Ten is equal to the prefixed time period td_1, td_2 . . . td_n, an element of the elements D1, D2 . . . Dn, having at the input the signals C1, C2 . . . Cn, transfers the signal to an alarm device 52 able to emit the alarm signal AL1, AL2 . . . ALn. If the logic signal C1, C2 . . . Cn is kept at high level for a time period equal to the prefixed time period td_1, td_2 . . . td_n, the logic signal C1, C2 . . . Cn is a real alarm and not a false one, that is not a disturb.

The battery charger according to an embodiment has a current consumption lower than the known ones. Particularly a reduction of about 70% is achieved with the battery charger in FIG. 2.

Preferably the enable time periods Ten for all the comparators Comp1, Comp2 . . . Compn occur at the same time instant Tc1; . . .

Figure 3:
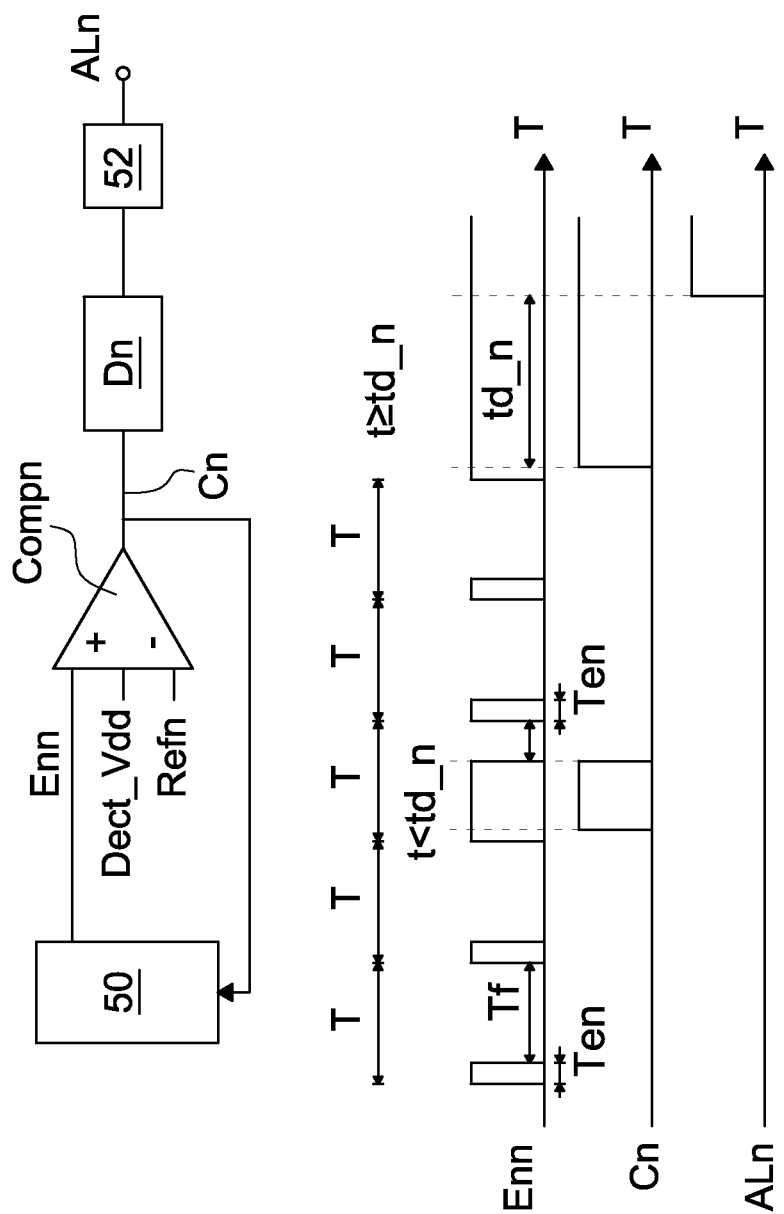
FIG. 3 shows a part of the battery charger in FIG. 2 and time diagrams of some signals in play.

Preferably the enable time periods Ten are equal for all the comparators Comp1, Comp2 . . . Compn As shown in more detail in FIG. 3, with reference to the comparator Compn, the control circuit 50 sends the enable signal Enn to the comparator Compn, when the battery 100 supplies the output terminal SYS, Ld. The enable signal Enn enables the comparator Compn for a time period Ten and disables it for a time interval Tf cyclically for each time period T with T=Ten+Tf. If during the time period Ten the signal Dect-Vdd is higher than the reference signal Refn, the comparator Compn outputs a high level logic signal Cn. The control circuit 50, which receives the signal Cn, enables said comparator for a longer time period Ten; if the logic signal Cn passes from the high level to the low level within the time period Ten when the time period Ten is shorter than a prefixed time period td_n, no alarm signal ALn is sent at the output otherwise, when the time period Ten is equal to the time period td_n, the element Dn, having the signal Cn at the input, transfers the signal Cn to alarm device 52 able to emit the alarm signal ALn.

Figure 4:
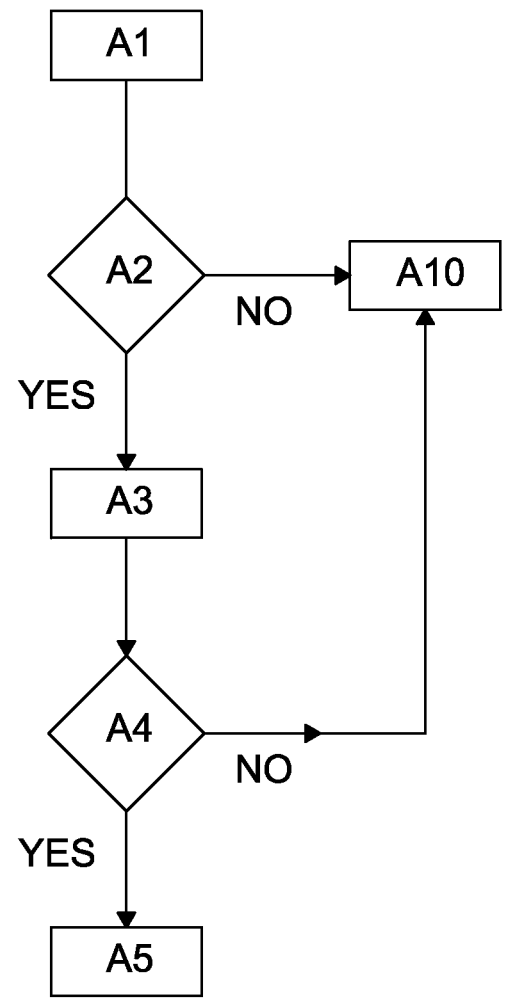
FIG. 4 shows a block diagram of the operation method of the battery charger according to embodiment.

The battery charger according to an embodiment operates according to the following method, as shown in FIG. 4.

The method comprises a step A1 for enabling at least one detection device at timing intervals Ten, preferably at regular timing intervals, when the battery 100 supplies the at least one output terminal SYS, Ld. Preferably said enabling step comprises enabling the at least one detection device for an enable time period Ten for each time period T. That is, when the battery 100 supplies the output terminals SYS, Ld and the signal GO_COMP is received by the control circuit 50, the same control circuit 50 is able to enable the at least detection device at timing intervals Ten, preferably at regular timing intervals. Preferably the control circuit 50 sends enable signals En1, En2 . . . Enn to the detection devices, that is the comparators Comp1, Comp2 . . . Compn. In this way the comparators Comp1, Comp2 . . . Compn are enabled for a time period Ten and output signals C1, C2 . . . Cn in response to the comparison between the signals BV, BC, . . . Dect-Vdd with the reference signals Ref1, Ref2, . . . Refn.

The operation method comprises a step A2 for verifying, after the enabling step A1, if an alarm condition is detected and a step A3 for enabling, if the verify operation is positive (Yes), said at least one device for a longer time period Ten, or a step A10 for disabling, if the verify operation is negative (No) said at least one detection device for a disable time period Tf between an enable time period Ten and the successive one. In the step A3 the control circuit 50, which is configured to receive the signals C1, C2 . . . Cn, receives one logic signal C1, C2 . . . Cn, that is one of the logic signals is at a high level and enables the respective comparator for a longer time period Ten.

After the step A3, a step A4 occurs to verify if said alarm condition is detected for a time period Ten equal to a prefixed time period td_1, td_2 . . . td_n, that is if said one logic signal C1, C2 . . . Cn is kept at the high logic level for a time period equal to a prefixed time period td_1, td_2 . . . td_n.

If the verify operation of the step A4 is positive (Yes) a further step A5 occurs for emitting an alarm signal AL1, AL2, . . . ALn otherwise (No), when the time period Ten is shorter than a prefixed time period td_1, td_2 . . . td_n, no alarm signal is emitted and the detection device is disabled by passing from the step A4 to the step A10.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:
1. A battery charger comprising:
an input supply terminal configured to receive a supply signal;
a battery terminal configured to be connected to a battery;
at least one output terminal and an electrical path between the battery terminal and the output terminal;

a plurality of comparators configured to detect at least one alarm condition of the battery or the battery charger; and a controller connected to each of the comparators and configured to enable each of said comparators at regular timing intervals at the same time instant when the battery supplies the at least one output terminal.

2. A battery charger according to claim 1, wherein said controller is configured to enable each of said comparators for an enable time period and disable said comparators for a disable time period between an enable time period and the successive one, said controller being configured to enable each of said comparators for a longer time period if an alarm condition is detected.

3. The battery charger according to claim 2, further comprising an alarm circuit connected to said comparators and configured to emit an alarm signal if the alarm condition is detected for an enable time period equal to a prefixed time period.

4. The battery charger according to claim 3, wherein each of said comparators is configured to compare a parameter signal representative of a parameter of the battery or the battery charger and a reference signal, wherein said controller is configured to enable each of said comparators for said enable time period, to verify if said parameter signal is higher than the reference signal and to increase the enable time period only if said parameter signal is higher than the reference signal, said alarm circuit being configured to emit an alarm signal if said parameter signal is kept higher than the reference signal for an enable time period equal to a prefixed time period.

5. The battery charger according to claim 1, wherein said alarm condition is an over current discharge condition or an over voltage discharge condition of the battery.

6. The battery charger according to claim 1, wherein said alarm condition is a presence of a supply signal at the input supply terminal.

7. A method of operating a battery charger, said battery charger comprising an input supply terminal configured to receive a supply signal, a battery terminal configured to be connected to a battery, at least one output terminal, an electrical path between the battery terminal and the output terminal, and a plurality of comparators in the electrical path detecting at least one alarm condition of the battery or the battery charger, the method comprising:
    enabling said comparators at regular timing intervals at the same time instant thereby detecting an alarm condition when the battery supplies the at least one output terminal.

8. The method according to claim 7, wherein said enabling step comprises enabling said comparators for an enable time period, said method comprising:
    verifying, after the enabling step, if an alarm condition is detected;
    enabling, if the verify operation is positive, said comparators for a longer enable time period or, if the verify operation is negative, disabling said comparators for a disable time period between an enable time period and the successive one;
    verifying, only after the step of enabling said at least one device for a longer enable time period, if said alarm condition is detected for a enable time period equal to a prefixed time period; and
    emitting an alarm signal if the verify operation of the preceding step is positive.

\* \* \* \* \*